I. W. PECK.
WIND SHIELD.
APPLICATION FILED JULY 1, 1916.
1,252,611.  Patented Jan. 8, 1918.
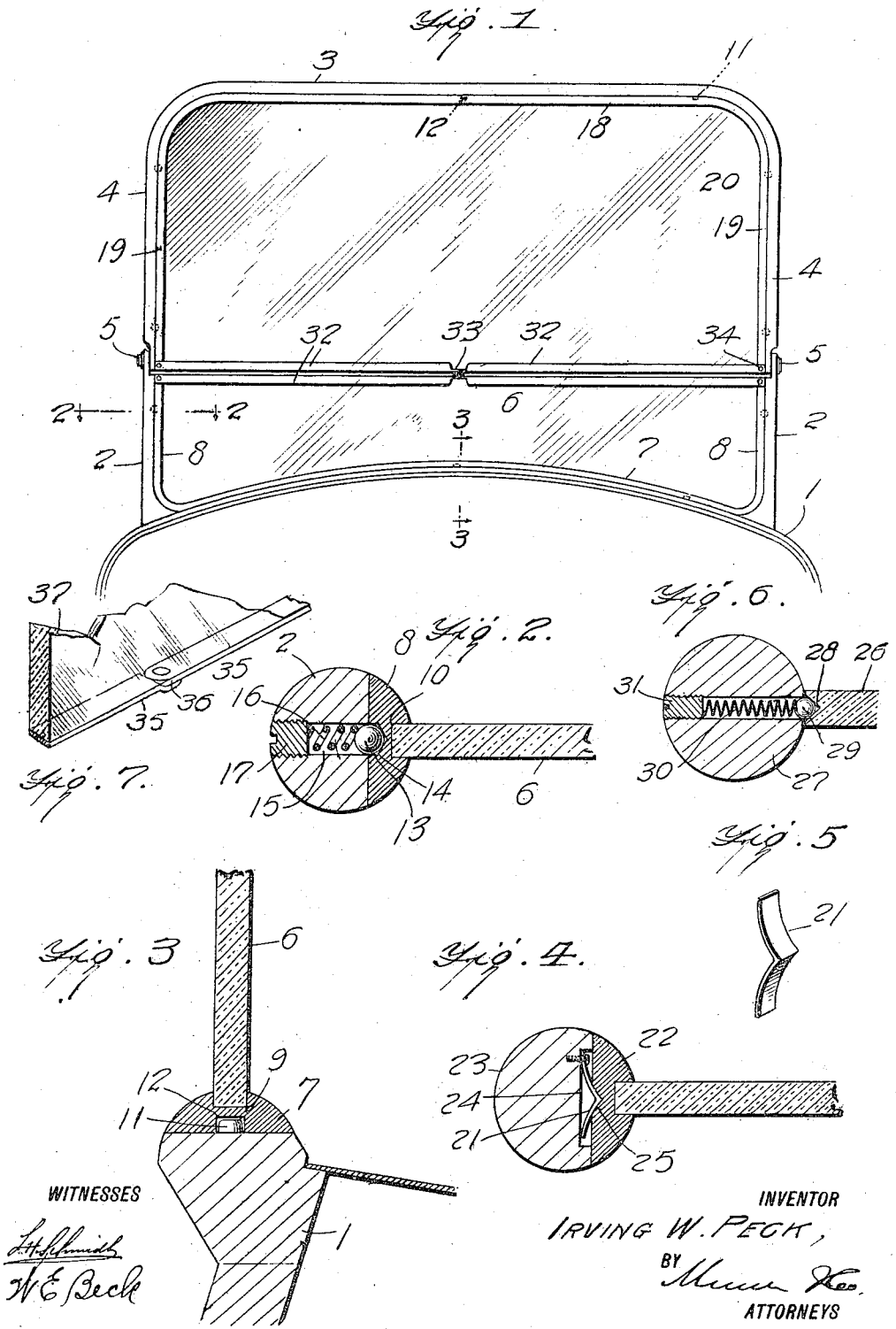

UNITED STATES PATENT OFFICE.

IRVING W. PECK, OF MACON, GEORGIA.

WIND-SHIELD.

1,252,611.　　　Specification of Letters Patent.　　Patented Jan. 8, 1918.

Application filed July 1, 1916.　Serial No. 107,032.

*To all whom it may concern:*

Be it known that I, IRVING W. PECK, a citizen of the United States, and a resident of Macon, in the county of Bibb and State of Georgia, have invented new and useful Improvements in Wind-Shields, of which the following is a specification.

My invention is an improvement in wind shields, and has for its object to provide a wind shield composed of a fixed portion connected with the vehicle, and a detachable portion carrying the glass and held within the fixed portion in such manner that the impact of a body of sufficient weight against the glass will displace the detachable frame and the glass, thus avoiding injury to the object striking the glass.

In the drawings:

Figure 1 is a front view of the improved wind shield,

Figs. 2 and 3 are sections on the lines 2—2 and 3—3 of Fig. 1, each looking in the direction of the arrows adjacent to the line, Fig. 4 is a view similar to Fig. 2, showing a modified construction, Fig. 5 is a perspective view of the retaining springs shown in Fig. 4.

Fig. 6 is a view similar to Fig. 4 of another modified construction, and

Fig. 7 is a partial perspective view of a modified form of dislodging bar.

As is known, in case of accident to a motor vehicle, as for instance in collision with other vehicles or with obstructions, it frequently occurs that the occupants are thrown into the shield, breaking the glass and receiving serious injury from the jagged fragments of the glass.

In the present embodiment of the invention, the motor vehicle indicated at 1 is provided with the usual supporting frame for the lower section of the wind shield, and composed of the upright brackets or standards 2. The upper section of the shield is arranged within a supporting frame of substantially U-shape, consisting of a body 3 and arms 4, which are pivoted to the uprights or standards 2. Each of these uprights or standards 2 as shown, is rabbeted on its inner face and the lower ends of the arms 4 are rabbeted on their outer faces to fit the rabbet of the standards and the arms and standards are pivoted together as indicated at 5, in such manner that the upper section may swing with respect to the lower section. The sheet 6 of glass forming the lower section of the wind shield, is held in a substantially U-shaped frame consisting of a body 7 and arms 8.

The frame 7—8 is of segmental cross section having its convexity inwardly, and the sheet 6 of glass is held in grooves 9 and 10 in the body and arms. This frame with the sheet of glass is releasably held between the standards in such manner that the impact of a body of sufficient weight from either direction, will displace the frame and glass. It will be noticed that the body 7 of the frame is curved or arched to correspond with the curve of the hood of the vehicle, and the fixed supporting frame for the wind shield has upwardly extending pins 11 on the arch which are adapted to engage depressions or recesses 12 in the outer surface of the body of the frame. The glass supporting frame 7—8 fits closely within the supporting frame 2 for the inner shield, and it will be evident that the engagement between the pins and the recesses will prevent lateral displacement of the glass supporting frame under normal conditions.

Near the top of the standards of the supporting frame for the wind shield, the arms 8 of the glass supporting frame are releasably held by means of balls 13, which engage recesses 14 in the arms of the glass supporting frame. These balls are spring pressed toward the glass supporting frame and are held in transverse openings 15 in the standards 2. A spring 16 is arranged in each opening, each spring bearing at one end against the ball 13 and at the other end against a screw plug, which is threaded into the outer end of the opening to close the same and to form a support for the outer end of the spring. The upper section of the wind shield is held in a frame of substantially U-shape consisting of a body 18 and arms 19, and the sheet 20 of glass is held in the frame in the same manner as for the lower section.

At the bodies of the frames 3—4 and 18—19, the pins 11 are provided on the body 3 and the said pins engage recesses 12 on the body 18 of the glass supporting frame. The arms 19 of the said glass supporting frame are engaged by balls in the same manner as the arms 8 of the lower section, and the said balls are mounted in precisely the same manner in the arms 4, as in the standards 2. Two balls are provided between each pair of arms 4 and 19. In Figs. 4 and 5 is shown a modified construction wherein substantially V-shaped springs 21 are provided for holding the glass supporting frame 22 in the fixed frame 23. The springs 21 are held in recesses 24 in the relatively fixed frame 23, and the apices of the said springs engage in V-shaped recesses 25 in the glass supporting frame 22. The springs 21 may take the place of the pins 11 also, if desired, and it is obvious that the balls might be substituted for the pins.

With the improved arrangement of the wind shield, should for instance, the automobile meet with sudden shock from collision or the like, sufficient to throw the occupant forward, the glass of the wind shield will not be broken by the force of the blow, thus causing injury to the occupants, but a blow sufficient to break the glass will displace the glass and supporting frame from the relatively fixed frame, and even if the glass is broken, it will not cause injury to the occupants since it will not be held in fixed position. That is, the glass will move with the moving occupant, so that no serious cutting action will result.

In the embodiment of the invention shown in Fig. 5, the sheet 26 of glass is seated directly on the holding frame 27, and at suitable intervals the glass is provided in its edge with recesses 28 which are adapted to be engaged by balls 29. These balls are mounted in the same manner as the balls shown in Fig. 2, being spring pressed toward the recesses by springs 30, the springs being held in place by retaining plugs 31.

It is possible that the glass might be broken by the impact of the occupant in such manner that the supporting frame therefor would not be dislodged, and to prevent this, the dislodging bars shown in Figs. 1 and 7 are provided. The bars shown in Fig. 1 are channel bars, each channel bar being sectional and engaging the edge of the glass as shown. Each bar consists of similar sections 32 hinged together at their adjacent ends, and connected at their outer ends as indicated at 34 to the arms 8 or 19 of the supporting frame for the glass. The side walls of the channel are cut away at the hinge, and the hinge is so arranged that the sections may swing in either direction in a horizontal plane. Should the occupant of the vehicle be thrown against the wind shield and the glass broken, the force of the impact will bend the sectional bars, drawing the ends of the arms 8 or 19 of the glass supporting frame inward, and insuring the disengagement of the balls 13 or the springs 21.

If desired, this dislodging bar may consist merely of plain sections 35 connected at their outer ends to the arms 8 or 19, and at their inner ends hinged together as shown at 36. The bars 35—35 rest upon the edge of the sheet 37 of glass, as shown in Fig. 7.

I claim:

1. In wind shields, the combination with the supporting frame and the glass, of an independent frame for supporting the glass and fitting within the supporting frame and having a releasable connection therewith, and a dislodging bar engaging the free edge of the glass and secured at its ends to the frame, and consisting of sections hinged together intermediate the ends of the frame.

2. In wind shields, the combination with the supporting frame and the glass, of an independent frame for supporting the glass and fitting within the supporting frame and having a releasable connection therewith, and a dislodging bar engaging the free edge of the glass, said bar consisting of hinged sections connected at the end remote from the hinged connection with the independent frame.

IRVING W. PECK.

Copies of this patent may be obtained for five cents each, by addressing the "Commissioner of Patents, Washington, D. C."